United States Patent
Davis

[11] 3,813,156
[45] May 28, 1974

[54] SIMULATED PLANETARIUM PROJECTOR

[76] Inventor: Arthur Davis, 3348 Canton Way, Studio City, Calif. 91604

[22] Filed: July 27, 1972

[21] Appl. No.: 275,811

[52] U.S. Cl. .............................................. 353/119
[51] Int. Cl. ..................... G03b 29/00, G03b 21/14
[58] Field of Search ............... 353/43, 89, 119, 122; 35/42.5

[56] References Cited
UNITED STATES PATENTS

| 2,498,294 | 2/1950 | Pennow et al. | 353/42 |
| 2,693,130 | 11/1954 | Green | 35/42.5 |
| 2,827,830 | 3/1958 | Vaux et al. | 33/42.5 |
| 3,176,581 | 4/1965 | Folden | 353/119 |

FOREIGN PATENTS OR APPLICATIONS

| 233,732 | 11/1925 | Great Britain | 353/119 |
| 1,326,664 | 4/1963 | France | 353/119 |
| 1,226,414 | 2/1960 | France | 353/119 |

Primary Examiner—Harry N. Haroian
Attorney, Agent, or Firm—Victor C. Muller

[57] ABSTRACT

Miniature projector which simulates the appearance of an actual planetarium projector which, when not in use, provides an object of visual interest. It incorporates a projector, having a conventional optical system, which, when in use, projects the subject matter contained on a conventional film strip, onto a screen or wall, as distinguished from an actual planetarium projector which projects spots of light onto a hemispherical screen which produces an artificial sky containing the various stars, planets, satellites, etc. It thus combines the visual interest of an actual planetarium projector and the utility of a conventional slide projector. It differs from the latter, however, in that its range of angular adjustment is considerably more, permitting the slide to be projected, not only onto a conventional vertical screen or wall, but also onto the ceiling of a room, whereby pictures and the like may be viewed by the user while lying in bed. It is of particular interest to children as a toy but has the utility of a conventional slide projector.

1 Claim, 2 Drawing Figures

PATENTED MAY 28 1974 3,813,156

3,813,156

SIMULATED PLANETARIUM PROJECTOR

BACKGROUND OF THE INVENTION

Planetariums are of relatively recent origin, the arrangement of a projector, disposed at the radial center of a hemispherical dome, probably being attributable to Carl Zeiss rotation of Jena. The viewing of an artificial sky has long been of interest to persons of all ages. The projector, due to its unusual and complicated construction, which is also of a unique single purpose type, has also commanded considerable visual interest. While planetarium projectors vary somewhat in construction, they all have the same general appearance, the features in common being a circular elongated frame, pivoted at its center for rotation about a horizontal axis, the ends of the circular frame carrying spherical members having a plurality of projection lenses. It might thus be characterized in general appearance as a dumbell having wart-like projections on its bulbous spherical ends.

SUMMARY OF THE INVENTION

The subject of the invention is characterized by a miniature construction which simulates an actual planetarium projector and incorporates sufficient features thereof to render it visually recognizable as a miniature planetarium projector. It has, however, the utility of a conventional slide projector, the various optical components of which have been oriented within the device in a specific and unique manner, consistent with the space available for same. More particularly, the projection light source, condenser lens system, and slide guide are disposed in a tube connecting the spherical ends, and the projection lens system is disposed within one of the spherical ends, each of which has insufficient space therein to contain the entire projection system when the overall simulated device is reduced to the size contemplated.

DETAILED DESCRIPTION OF PREFERRED EMBODIMENT

Figure 1:
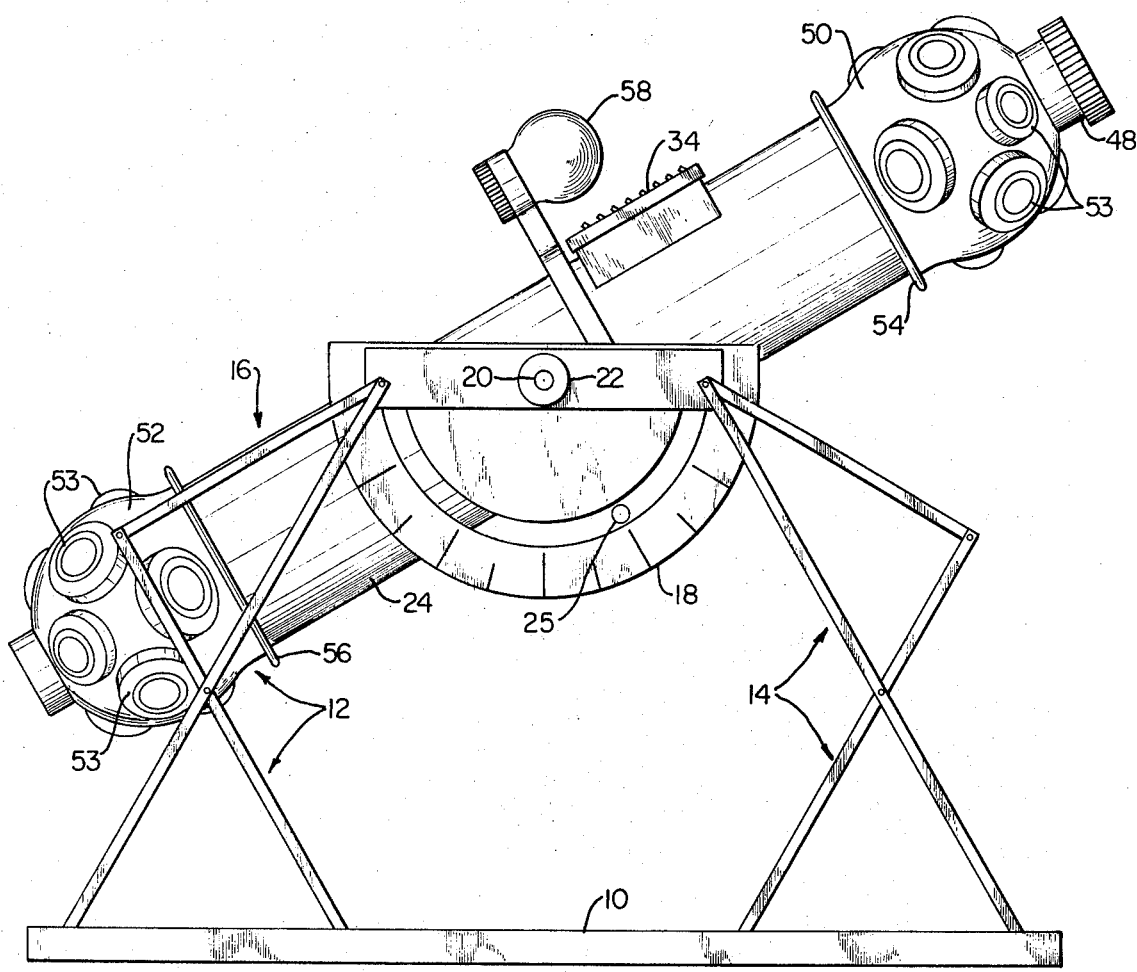
FIG. 1 is a side elevation of the subject of the invention.

Referring first to FIG. 1, the subject of the invention comprises a base 10, like projector supports 12,14 at each side of projector 16, and like protractors 18 at each side of the projector connecting the upper ends of supports 12,14. Supports 12,14 closely resemble those employed with an actual planetarium projector such as in the Dusseldorf Planetarium, Germany. A photograph of such projector may be found in the 1956 edition of Encyclopedia Britannica, plate 1 following page 1,000. As will be apparent, the protractors are not employed in the projector just referred to, these having been added for visual interest, particularly to children, and utility to familiarize same with vertical angles. A pivot pin 20 extends between the axes of the protractors and a knob 22 is affixed to each end for rotating the projector, the pin being rigidly affixed to tube 24. A pointer 25, one for each protractor, is affixed to tube 24 for indicating vertical angles. As will be apparent the axis of tube 24 may be swung to both sides of horizontal, and when in near vertical position may project a picture onto a ceiling of a room.

Tube 24 simulates the outer shape of the open framework of an actual planetarium projector but, since a portion of same is employed for a projector light source and lens system, not present in an actual planetarium projector, the tube is preferably closed and opaque to obviate projection of unwanted stray light into the room.

Figure 2:
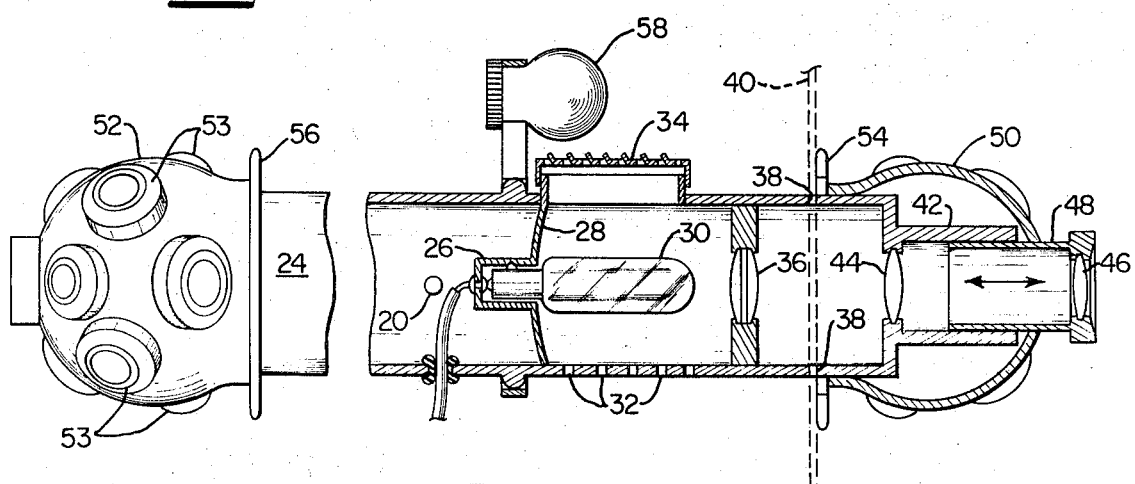
FIG. 2 is a like elevation, the support being omitted, a portion broken away, and the remainder shown in section taken on the longitudinal vertical central plane of FIG. 1.

With reference to FIG. 2, a suitable socket 26 is supported within tube 24 by a reflector 28, the socket supporting the base of a projector light 30. Suitable apertures, 32 are provided to permit cool air to enter the tube and a removable venetian blind apertured cover 34 is provided to permit heated air to exhaust from the tube whereby the lamp house may dissipate heat generated by the projector light filament. A condenser lens system 36 of any conventional form is provided to form parallel light rays at its right or emanating side. Slots 38,38 are also provided in tube 24 for slideably receiving a strip 40 having spaced transparency frame thereon. While not shown, a light spring may bear against strip 40 to frictionally maintain a frame disposed symmetrical with the optical axis.

Tube 24 is provided with a smaller tube 42 which contains a fixed lens 44 and an axially adjustable lens 46, carried by a tube 48 which may be slid within tube 42 to focus the projection on a screen.

Bulbous spherical ends 50,52 are secured to the ends of tube 24, each having a plurality of projections 53 thereon which simulate the appearance of the projection lenses of an actual planetarium projector. Rings 54,56 are also secured to tube 24 adjacent spherical ends 50,52 which simulate those of an actual planetarium projector and which carry other projection lenses. These have been omitted in the drawing but may also be simulated if desired. Another simulated projection system in the form of a sphere 58 is provided at one side of tube 24 intermediate its ends which may similarly be provided with simulated lenses (not shown) projecting therefrom.

I claim:

1. A minature simulated planetarium projector for entertainment and education of children, comprising:

a. a base adapted to rest on a support, such as a table or the like, b. four like legs extending upwardly from the base, said legs being so constructed to have the general appearance of their counterparts of an actual planetarium, such as the legs of the Dusseldorf planetarium, c. an elongated tube pivotally connected substantially mid-way between its ends to the legs for movement about a horizontal axis, whereby the axis of the tube may be elevated and lowered in elevation, said tube being of right circular cylindrical shape to have the general appearance of the cage counterpart of an actual planetarium but differing therefrom in that it is opaque to prevent transmission of light through the wall thereof.

d. a generally spherical bulbous hollow end secured to the front and rear ends of the tube, e. a plurality of simulated planetarium projection lenses disposed on each bulbous end, f. a pair of diametrically opposed slots in the tube spaced rearwardly from one end thereof and disposed rearwardly adjacent the front bulbous end, forming a film gate through which a strip of film may be fed for selectively disposing spaced frames thereon in registry with the axis of the tube, g. a condenser lens system within the tube spaced rearwardly from the film gate, h. a projection light within the tube spaced rearwardly from the condenser lens system, i. a fixed lens within said tube disposed between the film gate and the adjacent end of the tube and within the front bulbous end, said adjacent end extending at least partially into the front bulbous surrounding end, j. a tube having a focusing lens therein slideably disposed within said adjacent end, the tube aforesaid projecting beyond the front bulbous end whereby it msy be grasped by the fingers for axially adjusting same, k. said slots, condenser lens, and projecting light being disposed within the front portion of the tube and being of an axial length such as to prevent disposing same within the front bulbous end, but the front bulbous end being of sufficient axial length to contain said fixed lens and a portion of the focusing lens tube, whereby the various components of the optical system are so related to the available space within the tube and front bulbous end to minimize the overall size of the projector and render same comparable to the size of a conventional table supported projector, and l. a protractor disposed at each side of the tube, each protractor forming a support at an axis thereof for the pivoted connection of the tube, each protractor having outer opposite portions spaced from its axis, each outer portion being connected to an upper end of one of said four like legs, and a pair of pointers, one for each protractor and carried by the tube for indicating the vertical angle of the projector optical axis.

* * * * *